(12) United States Patent
Takaishi

(10) Patent No.: US 7,423,836 B2
(45) Date of Patent: Sep. 9, 2008

(54) SETTLING JUDGMENT METHOD FOR POSITION CONTROL DEVICE AND POSITION CONTROL DEVICE

(75) Inventor: Kazuhiko Takaishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/604,489

(22) Filed: Nov. 27, 2006

(65) Prior Publication Data

US 2008/0024907 A1      Jan. 31, 2008

(30) Foreign Application Priority Data

Jul. 28, 2006   (JP)   .............. 2006-206651

(51) Int. Cl.
   *G11B 5/55*   (2006.01)
(52) U.S. Cl. .................................. 360/78.04
(58) Field of Classification Search ............ None
   See application file for complete search history.

(56) References Cited

U.S. PATENT DOCUMENTS

| | | | |
|---|---|---|---|
| 5,307,330 A | | 4/1994 | Okamura |
| 5,731,973 A | | 3/1998 | Takaishi et al. |
| 5,859,742 A | | 1/1999 | Takaishi |
| 5,914,830 A | | 6/1999 | Kadlec |
| 6,101,065 A | * | 8/2000 | Alfred et al. ............ 360/78.04 |
| 6,111,714 A | * | 8/2000 | Ueda et al. ............. 360/78.04 |
| 6,195,222 B1 | * | 2/2001 | Heminger et al. ........ 360/78.04 |
| 6,313,964 B1 | * | 11/2001 | Lamberts et al. ............ 360/75 |
| 6,324,132 B1 | * | 11/2001 | Kagami et al. ........... 360/78.04 |
| 6,347,018 B1 | * | 2/2002 | Kadlec et al. ............ 360/77.08 |
| 6,597,530 B2 | * | 7/2003 | Asano et al. ............. 360/78.14 |
| 6,690,537 B2 | * | 2/2004 | Kagami et al. ........... 360/78.04 |
| 6,917,483 B2 | * | 7/2005 | Gupta et al. ............. 360/78.06 |
| 6,995,944 B1 | | 2/2006 | Takaishi et al. |
| 7,061,714 B1 | * | 6/2006 | Yu ...................... 360/78.07 |
| 2005/0046984 A1 | | 3/2005 | Gupta et al. |
| 2005/0152058 A1 | * | 7/2005 | Schmidt .................. 360/78.04 |
| 2006/0007592 A1 | | 1/2006 | Takaishi et al. |
| 2007/0230035 A1 | * | 10/2007 | Takaishi ................. 360/78.04 |
| 2007/0230305 A1 | | 10/2007 | Takaishi |
| 2008/0024907 A1 | | 1/2008 | Takaishi |

FOREIGN PATENT DOCUMENTS

| | | |
|---|---|---|
| EP | 0 744 754 | 5/1997 |
| EP | 1 276 100 | 1/2003 |
| JP | 4-298868 | 10/1992 |
| JP | 07-295650 | 11/1995 |
| JP | 08-106742 | 4/1996 |

* cited by examiner

*Primary Examiner*—Hoa T. Nguyen
*Assistant Examiner*—James L Habermehl
(74) *Attorney, Agent, or Firm*—Greer, Burns & Crain, Ltd.

(57) ABSTRACT

In a settling judgment method for judging whether an object is settled at a target position, a margin for settling judgment is expanded, and settling is judged accurately. As the settling judgment formula of the settling judgment block, both the position error and the added value of the position errors of a plurality of samples are used. Particularly for the vibration in the low frequency area, the margin for settling judgment increases. Therefore even if vibration exists in the low frequency area, judging as deviation from the settling judgment conditions by mistake can be decreased, and operations (e.g. read/write operation) can be continued.

15 Claims, 13 Drawing Sheets

PosA  PosB  PosC  PosD

Servo Mark
Gray Code
Index

FIG. 10

| FREQUENCY F | MAXIMUM RATE Rate(Max) |
|---|---|
| $f_1$ | |
| $f_2$ | |
| ⋮ | |
| $f_n (=F_s/2)$ | |

SETTLING JUDGMENT METHOD FOR POSITION CONTROL DEVICE AND POSITION CONTROL DEVICE

CROSS-REFERENCE TO RELATED APPLICATIONS

This application is based upon and claims the benefit of priority from the prior Japanese Patent Application No. 2006-206651, filed on Jul. 28, 2006, the entire contents of which are incorporated herein by reference.

BACKGROUND OF THE INVENTION

1. Field of the Invention

The present invention relates to a settling judgment method for judging whether an object is settled in a target position or is following up the target position in a positioning control device for moving an object to a target position by an actuator, and its position control device and more particularly to a settling judgment method for a positioning control device for accurately judging settling even if vibration is applied, and a positioning control device.

2. Description of the Related Art

A positioning control device for moving an object to a target position is widely used. For this positioning control device, especially used for a disk device, for example, high precision positioning is demanded. Particularly for a magnetic disk device and optical disk device, accurate positioning of the head to the target track is extremely important to improve recording density. Settling judgment is a method for judging whether positioning to the target position is being controlled accurately.

In the settling judgment of a positioning control device, the positioning control after moving or after the position deviates must satisfy predetermined positioning conditions for a predetermined time. For example, in the case of the magnetic disk device, settling judgment after seek control and settling judgment during follow up control are used.

In this settling judgment, it is judged as settling completion when the value of a judgment formula based on a position error is continuously in a predetermined slice range, and the number of times of continuation is more than a predetermined count (sample count). For example, a method of judging settling completion when the position error itself is within a predetermined slice range continuously for a predetermined count, and a method of judging settling completion when the position error itself and a difference between position error of a previous sample and position error of a current sample (estimated position of one sample ahead), are within a predetermined slice range continuously for a predetermined count.

As a settling judgment method, a method for estimating the position of the next sample (Japanese Patent Application Laid-Open No. H08-106742) and a method for using an estimated position using an observer have been proposed (Japanese Patent Application Laid-Open No. H04-298868).

SUMMARY OF THE INVENTION

For example, in a disk device, a width of a data track is predetermined and data tracks are positioned adjacent to each other in the radius direction. Therefore if the head moves to an adjacent track after settling judgment, which is performed after seeking or during follow up, data may be erased by mistake. Or a part of the data may be erased, and the S/N of recorded data may deteriorate.

Also in the restoration control during seek control or follow up control of the disk device, the settling judgment time should be short to improve response performance. But if it is too short, residual vibration after seeking is missed, and positioning accuracy after settling completes drops.

In the above mentioned prior art, the position error must be in a predetermined slice value range, and the estimated position of one sample ahead must also be in a predetermined slice, and this is based on the concept that the settling judgment condition can be maintained even if vibration is applied after settling is judged. In other words, even if the position error is within a predetermined slice, the position error may possibly exceed the slice in the next and later samples if the estimated position of one sample ahead is far, so not only the position error but also an estimated position of one sample ahead is checked, as mentioned above.

On the other hand, a recent positioning control device used for a disk device, for example, is sometimes used in an environment which may receive vibration from the outside. Examples of such use in an external vibration environment are mounting a disk device in a portable personal computer, a portable AV (Audio/Visual) device, a portable device such as a portable telephone, and a mobile device, such as car navigation equipment.

Under this environment, various frequencies of vibrations may be applied from the outside, and in the settling judgment at the above mentioned position and at an estimated position of one sample ahead, even a minor vibration may cause the judgment result of a settling fault.

With the foregoing in view, it is an object of the present invention to provide a settling judgment method for a positioning control device for accurately judging settling even in an external vibration environment, and the positioning control device.

It is another object of the present invention to provide a settling judgment method for a positioning control device for judging settling and continuing operation even under a low frequency vibration environment, and the positioning control device.

It is still an object of the present invention to provide a settling judgment method for a positioning control device for improving the settling judgment margin in a low frequency area, and improving positioning accuracy, and the positioning control device.

To achieve these objects, the settling judgment method of the present invention is a settling judgment method for judging the settling of an object to a target position of a positioning control device which performs position control according to a position error between the target position and a current position, having: a step of computing the position error for each sample; a first computing step of computing a first judgment value from the position error for each of the samples; a first judgment step of judging a sample count, in which the first judgment value becomes less than a first slice value continuously, has reached a first judgment sample count; a second computing step of computing a second judgment value from added position errors of a plurality of samples; a second judgment step of judging whether a sample count, in which the second judgment value becomes less than a second slice value continuously, has reached a second judgment sample count; and a step of outputting AND of judgment results of the first judgment step and the second judgment step as a settling judgment result.

The positioning control device of the present invention has a positioning control block for performing position control for an object according to a position error between a target position and a current position, and a settling judgment block for computing a first judgment value from the position error for each sample, and judging whether a sample count, in which the first judgment value becomes less than a first slice value continuously, has reached a first judgment sample count, wherein the settling judgment block computes a second judgment value from added position errors of a plurality of samples for each of the samples, judges whether a sample count, in which the second judgment value becomes less than a second slice value continuously, has reached a second judgment sample count, and outputs AND of the two judgment results as a settling judgment result.

Also in the present invention, it is preferable that the second computing step further has a step of computing the second judgment value by adding the absolute values of the position errors of the plurality of samples.

Also in the present invention, it is preferable that the second judgment step further has a step of judging whether the sample count has reached the second judgment sample count which is less than 5.

Also in the present invention, it is preferable that the second computing step further has a step of judging the second judgment value by the addition of position errors of less than 4 samples.

Also in the present invention, it is preferable that the first judgment step further has a step of judging whether the sample count has reached the first judgment sample count which is less than 5.

Also it is preferable that the present invention further has a third computing step of computing a third judgment value from a difference between the position error of the current sample and the position error of the previous sample for each of the samples, and a third judgment step of judging whether the sample count, in which the third judgment value becomes less than a third slice value continuously, has reached a third judgment sample count, wherein the output step further has a step of outputting AND of the judgment results of the first judgment step, the second judgment step and the third judgment step as a settling judgment result.

Also in the present invention, it is preferable that the output step further has a step of outputting the judgment result on whether the position of a head is settled at the target position on a disk.

In the present invention, both the position error and the added value of a plurality of samples of position errors are used as the settling judgment formulas, so the margin of the settling judgment, particularly for vibration in the low frequency area, increases. Therefore even if vibration exists in the low frequency area, a large margin can be taken, so that judging as a deviation from settling judgment conditions by mistake can be decreased, and operations (e.g. read/write operation) can be continued.

In the present invention, both the position error and the added value of a plurality of samples of position errors are used as the settling judgment formulas, so the margin of the settling judgment, particularly for vibration in the low frequency area, increases. Therefore even if vibration exists in the low frequency area, a large margin can be taken, so that judging as a deviation from settling judgment conditions by mistake can be decreased, and operations (e.g. read/write operation) can be continued.

BRIEF DESCRIPTION OF THE DRAWINGS

FIG. 10 shows a table of the maximum value ratio for each frequency in FIG. 7 to FIG. 9;

DESCRIPTION OF THE PREFERRED EMBODIMENTS

Embodiments of the present invention will now be described in the sequence of the configuration of the positioning control device, first embodiment of settling judgment configuration, second embodiment of settling judgment configuration, third embodiment of settling judgment configuration, other embodiments of settling judgment configuration, and other embodiments, but the present invention is not limited to these embodiments.

Configuration of Positioning Control Device

Figure 1:
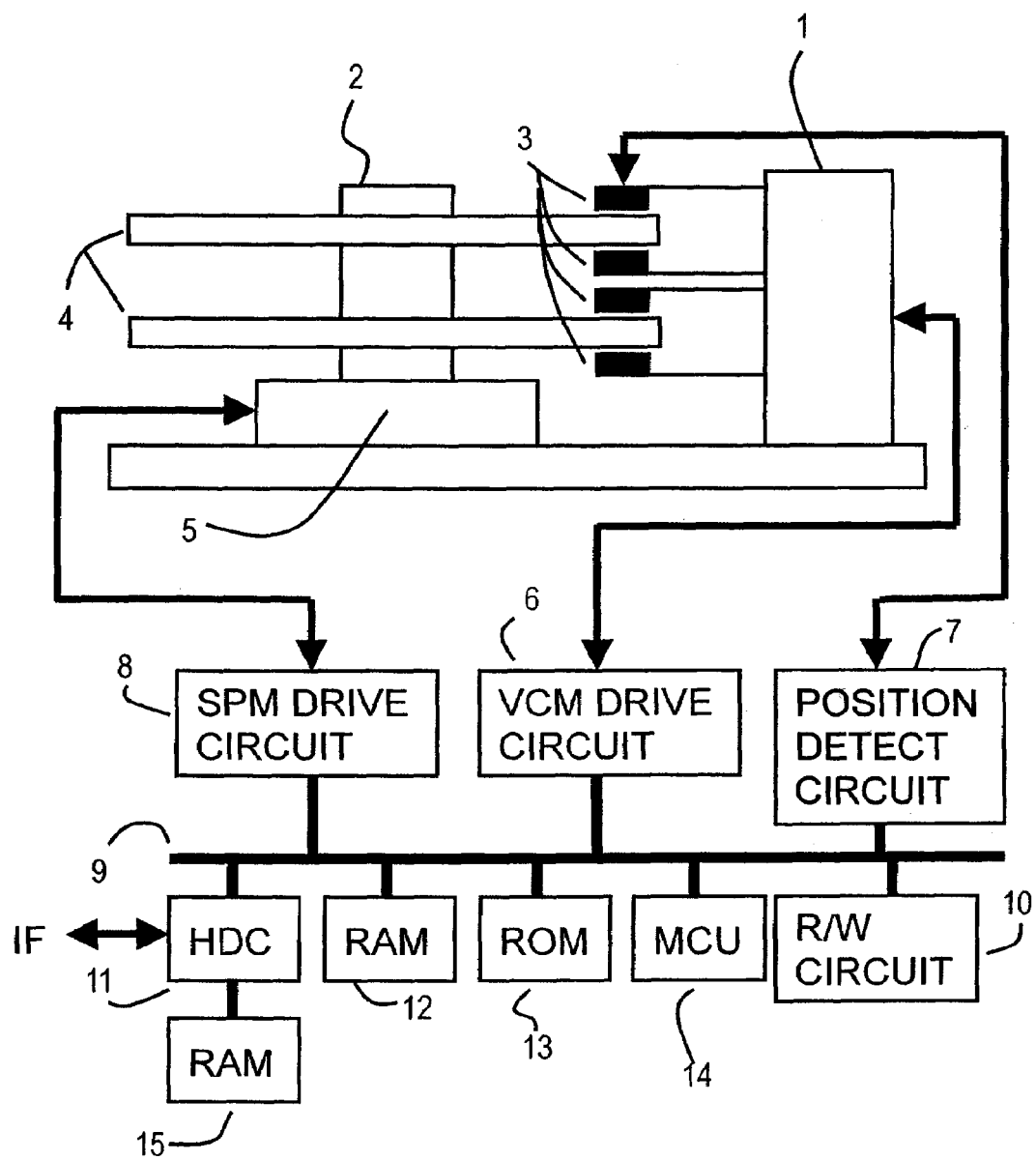
FIG. 1 is a block diagram depicting a positioning control device according to an embodiment of the present invention.
Figure 2:
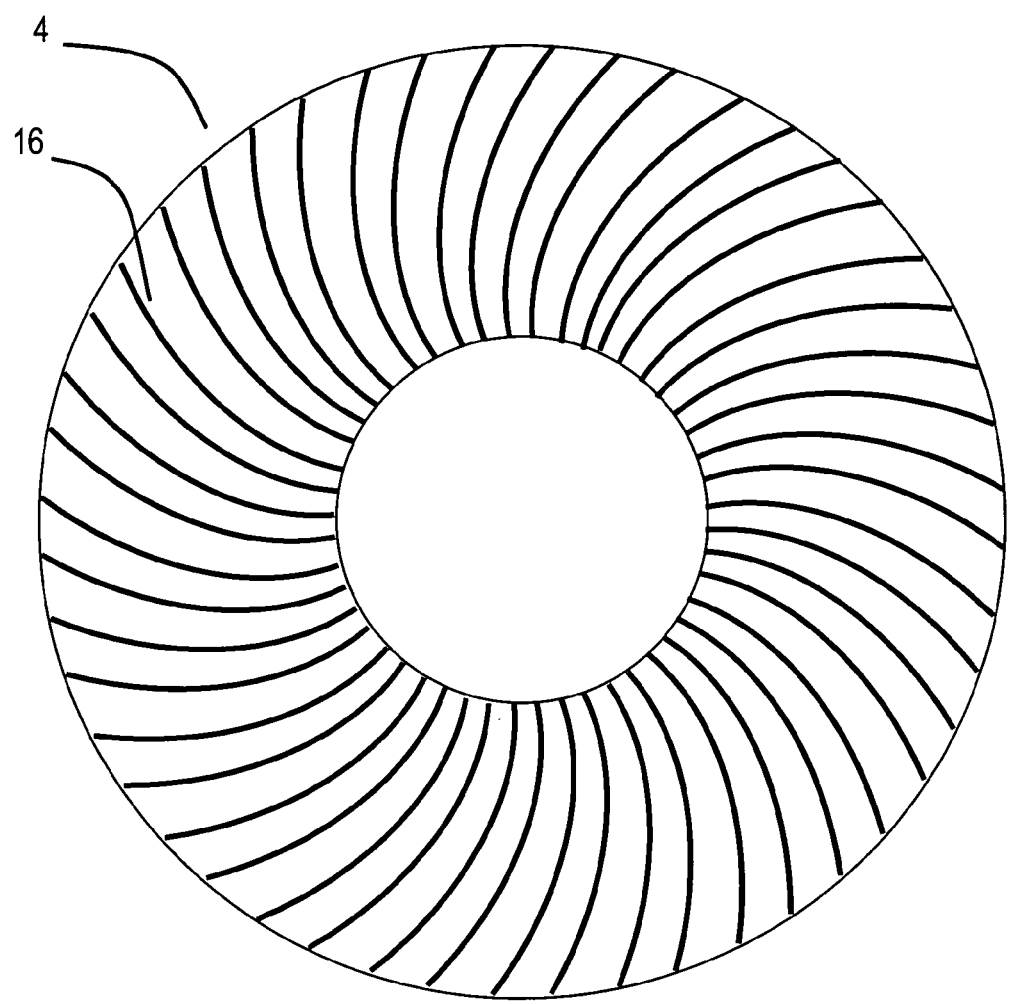
FIG. 2 is a diagram depicting the magnetic recording medium in FIG. 1.
Figure 3:
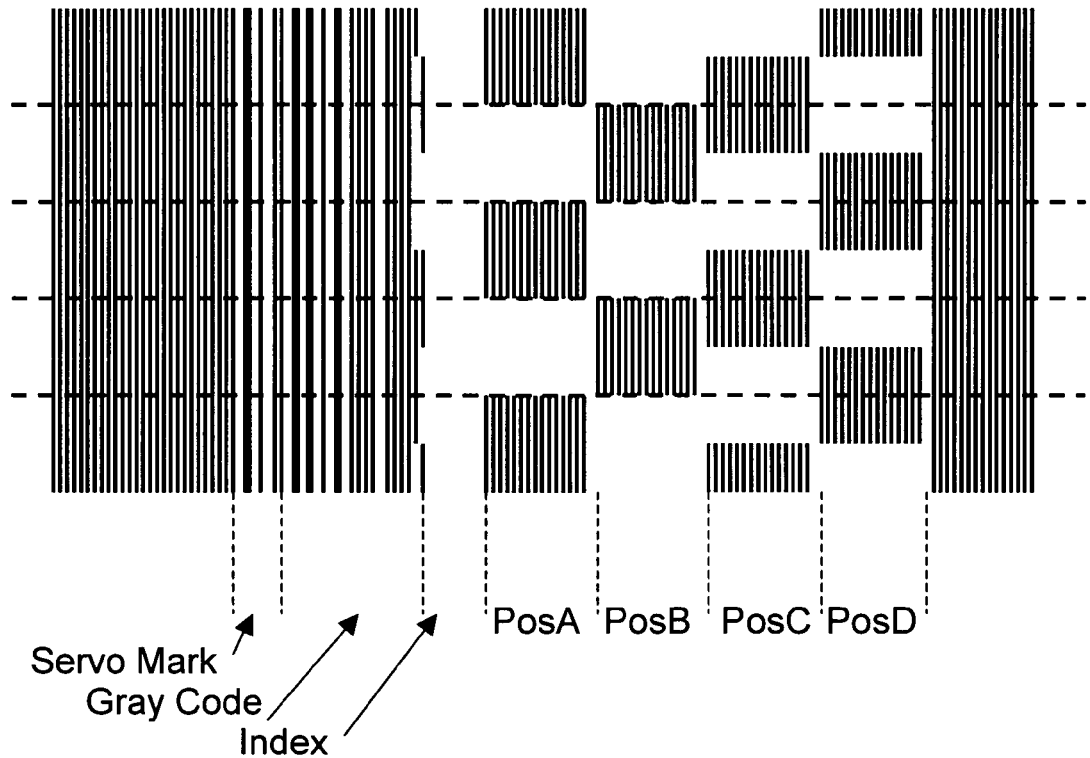
FIG. 3 is a diagram depicting the servo area in FIG. 2.
Figure 4:
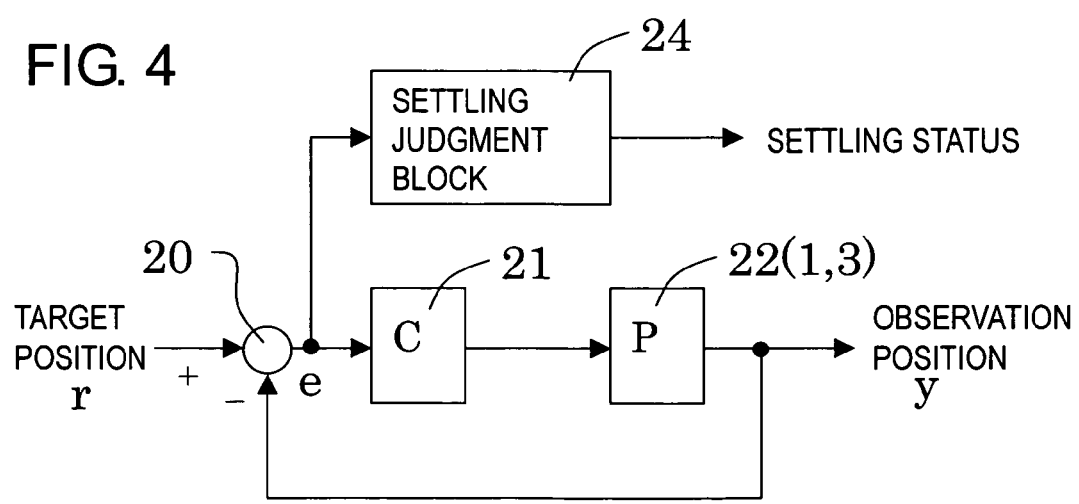
FIG. 4 is a block diagram depicting the positioning control system in FIG. 1.
Figure 5:
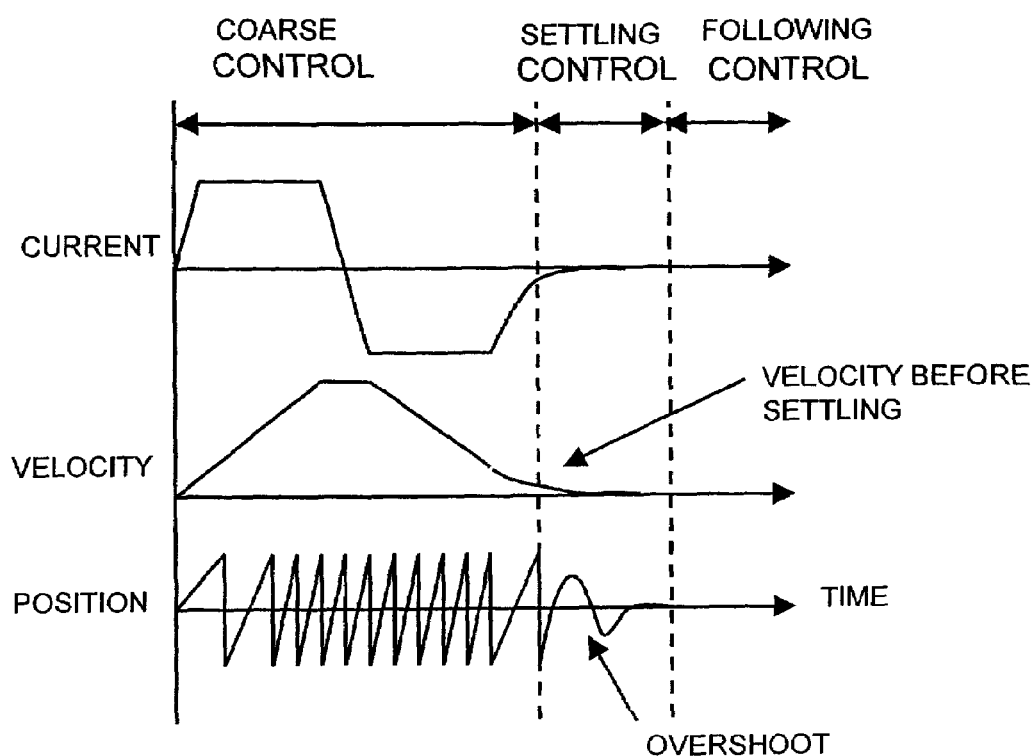
FIG. 5 is a diagram depicting a transition of head movement control in FIG. 1 and FIG. 4.

FIG. 1 is a block diagram depicting the positioning control device according to an embodiment of the present invention, FIG. 2 is a diagram depicting the arrangement of the position signals and tracks of the magnetic disk in FIG. 1, FIG. 3 is a diagram depicting the position signals in FIG. 1 and FIG. 2, FIG. 4 is a block diagram depicting the head position control system in FIG. 1, and FIG. 5 is a diagram depicting the head position control in FIG. 1 and FIG. 4.

FIG. 1 is a magnetic disk device which is a type of disk device, as a positioning control device. As FIG. 1 shows, a magnetic disk 4, which is a magnetic storage medium, is installed at a rotation axis 2 of a spindle motor 5. The spindle motor 5 rotates the magnetic disk 4. An actuator (VCM) 1 has a magnetic head 3 at the tip, and moves the magnetic head 3 in the radius direction of the magnetic disk 4.

The actuator 1 is comprised of a voice coil motor (VCM) which rotates with the rotation axis as the center. In FIG. 1, two magnetic disks 4 are mounted on the magnetic disk device, and four magnetic heads 3 are simultaneously driven by the same actuator 1. The configuration is the same even if one magnetic disk 4 and two magnetic heads are used.

The magnetic head 3 is a separate type head, which has a read element and a write element. The magnetic head 3 is comprised of a read element, including a magneto-resistance (MR) element, stacked on the slider, and a write element, including the write coil, stacked thereon.

The position detection circuit 7 converts the position signal (analog signal) read by the magnetic head 3 into a digital signal. The read/write (R/W) circuit 10 controls read and write of the magnetic head 3. The spindle motor (SPM) drive circuit 8 drives the spindle motor 5. The voice coil motor (VCM) drive circuit 6 supplies the drive current to the voice coil motor (VCM) 1, and drives the VCM 1.

A microcontroller (MCU) 14 detects (demodulates) the current position from the digital position signal from the position detection circuit 7, and computes the VCM drive instruction value according to an error between the detected position and the target position. In other words, MCU 14 performs position demodulation and servo control (position control). A read only memory (ROM) 13 stores the control program of the MCU 14. A random access memory (RAM) 12 stores data for processing by the MCU 14.

A hard disk controller (HDC) 11 judges a position in one track based on the sector number of the servo signal, and records/reproduces the data. A random access memory (RAM) 15 for a buffer temporarily stores read data and write data. The HDC 11 communicates with the host via an interface IF, such as USB (Universal Serial Bus), ATA (AT Attached) and SCSI (Small Computer System Interface). A bus 9 connects these composing elements.

As FIG. 2 shows, the magnetic disk 4 has a servo area 16 for recoding servo information where servo signals are arranged in the sector of each track in the circumference direction from the outer circumference to the inner circumference. The solid line in FIG. 2 indicates a recording position of the servo information 16.

As FIG. 3 shows, for the servo information 16, the position signals (servo information) are recorded by magnetic recording, or by mechanical patterns, such as pits. This position signal is comprised of a servo mark ServoMark, track number GrayCode, index Index, and offset information (servo burst) PosA, PosB, PosC and PosD. The dotted line in FIG. 3 shows the track center of the servo.

The position signals in FIG. 3 are read by the read element of the head 3, and the position of the magnetic head in the radius direction is detected using the track number GrayCode and the offset information PosA, PosB, PosC and PosD. Also the position of the magnetic head in the circumference direction is acquired based on the index signal Index.

For example, the sector number when the index signal is detected is set to No. 0, which is counted up every time the servo signal is detected, so as to acquire the sector number of each sector of the track. The sector number of the servo signal is used as a reference when data is recorded and reproduced. There is one index signal in one track. The sector number may be set instead of the index signal.

FIG. 4 is a block diagram depicting computing in the servo control system which is executed by the MCU 14. As FIG. 4 shows, in the servo control system, the computing block 20 computes the position error 'e' between the target position 'r' and the current position 'y'. The control block (Cn) 21 computes the control amount Un, and drives the VCMs 1 and 3 which comprise the plant 22. For the position of the plant, the servo signal from the magnetic head 3 is demodulated, the current position 'y' is computed from the demodulation result, and the position 'y' is fed back to the computing block 20. The settling judgment block 24 judges settling from the position error 'e', using the settling judgment formula and the settling judgment conditions (slice value, sample count). For the settling judgment formula, either the position error e (=Y[n]) itself is used, or (2·Y[n]−Y[n−1]) is used together with Y=[n].

FIG. 5 shows an example of the seek control of the actuator executed by the MCU 14 in FIG. 1 and FIG. 4. The MCU 14 confirms the position of the actuator through the position detection circuit 7 in FIG. 1, performs servo computation, and supplies appropriate current to the VCM 1. FIG. 5 shows the transition of control from the start of seeking when the head 3 is moved from a certain track position to the target track position, current of the actuator 1, velocity of the actuator (head) and position of the actuator (head).

In other words, in seek control, the head is moved to the target position through the transition from coarse control, settling control and following control. The coarse control is a position or velocity control, and settling control and following control are basically position controls for both of which the current position of the head 3 must be detected. In this settling control, settling is judged and read or write is enabled. Also in the following control, the settling is judged when the head is restored to the track center when off track occurs. Also during following control, it is judged whether the settling judgment conditions are satisfied.

To confirm the position like this, the servo signals are recorded on the magnetic disk in advance, as mentioned in FIG. 2 and FIG. 3. In other words, as FIG. 3 shows, servo marks which indicate the start position of the servo signal, gray code which indicates the track number, index signal and signals PosA-PosD which indicate the offset, are recorded on the magnetic disk in advance. These signals are read by the magnetic head 3, and these servo signals are converted into digital values by the position detection circuit 7.

First Embodiment of Settling Judgment Mechanism

Figure 6:
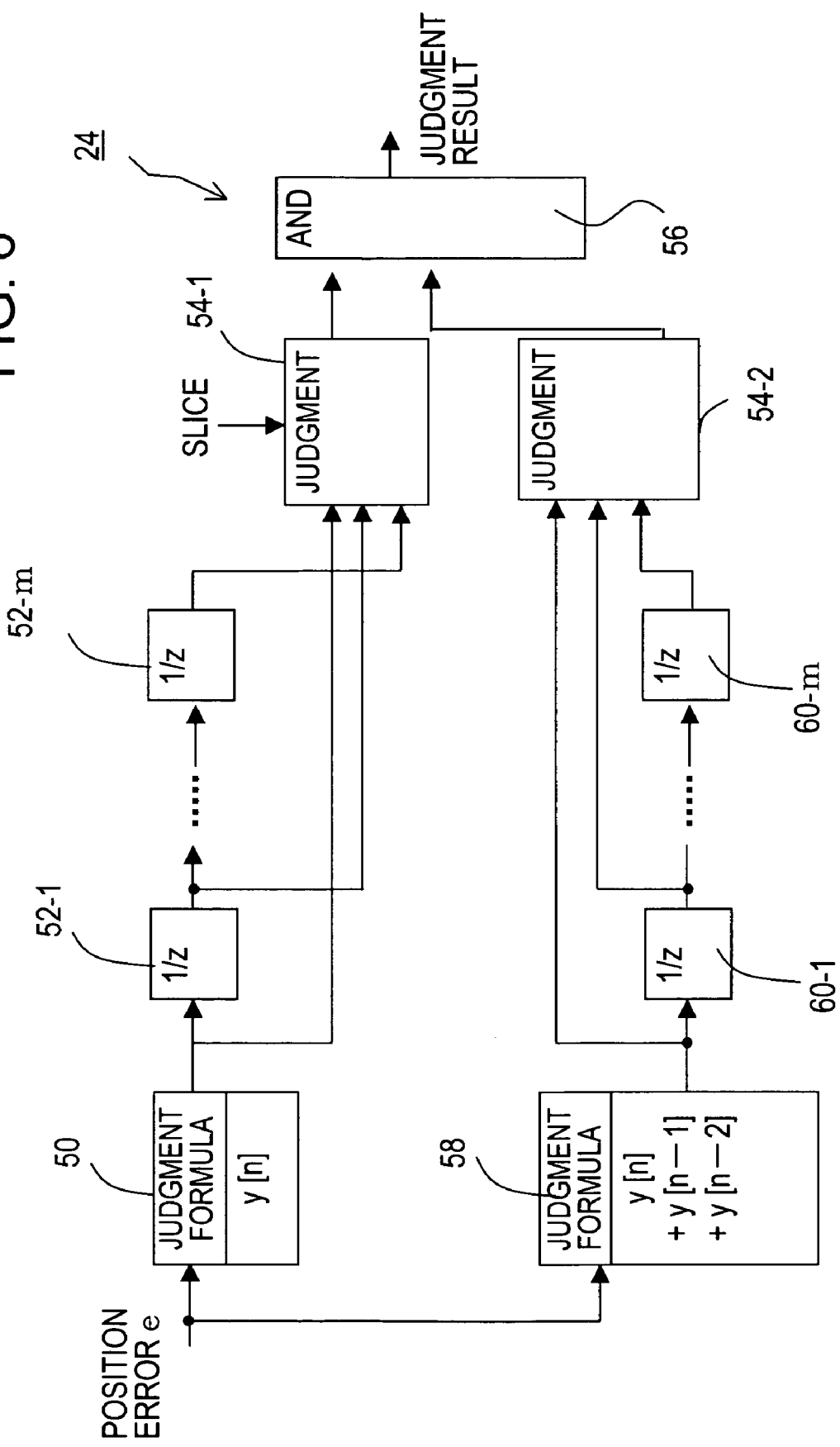
FIG. 6 is a block diagram depicting the settling judgment block of the first embodiment of the present invention.
Figure 7:
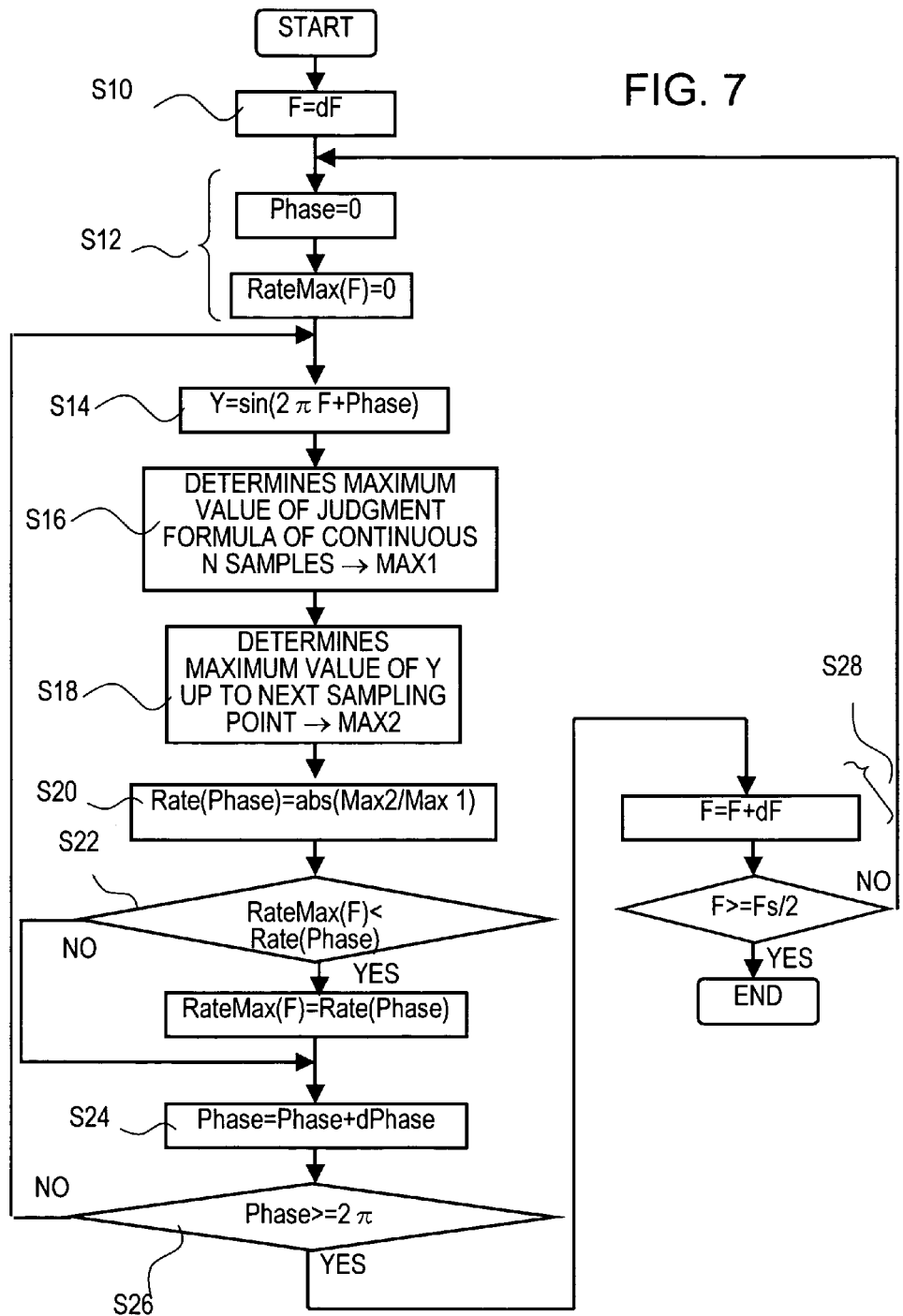
FIG. 7 is a flow chart depicting the maximum value ratio computing processing of settling judgment for each frequency according to an embodiment of the present invention.
Figure 8:
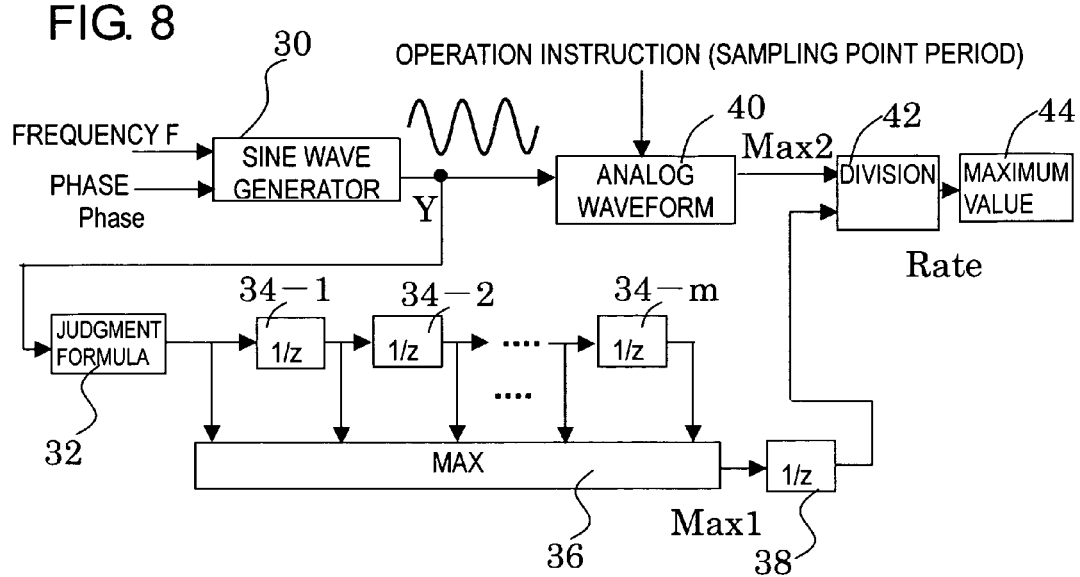
FIG. 8 is a block diagram depicting the maximum value ratio computing processing for each frequency in FIG. 7.
Figure 9:
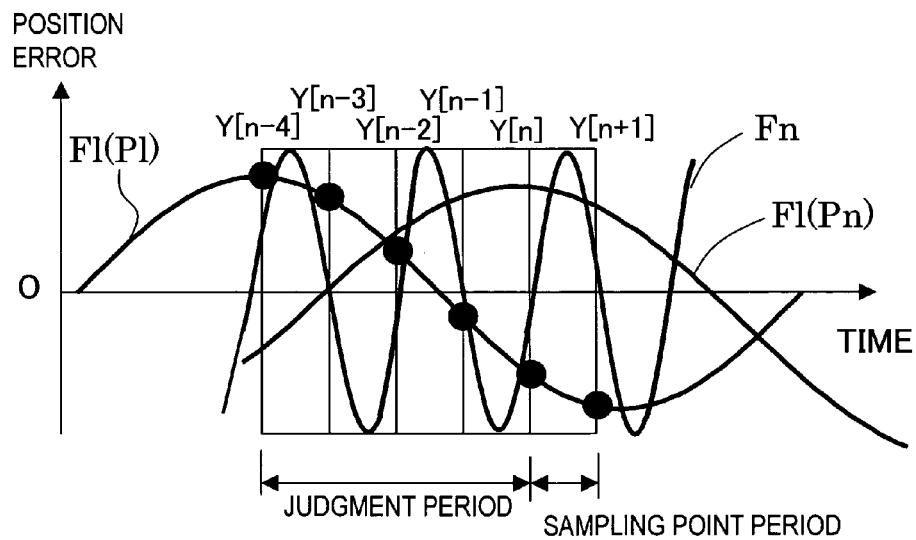
FIG. 9 is a diagram depicting the maximum value ratio computing processing for each frequency in FIG. 7 and FIG. 8.
Figure 11:
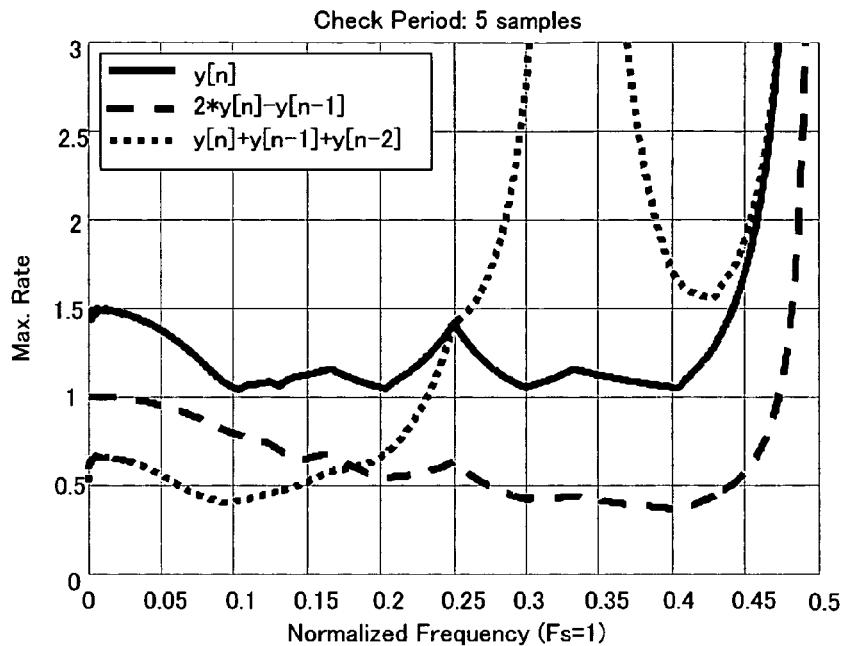
FIG. 11 is a relational diagram depicting the 5 sample judgment period acquired by the maximum value ratio computation for each frequency in FIG. 7.
Figure 12:
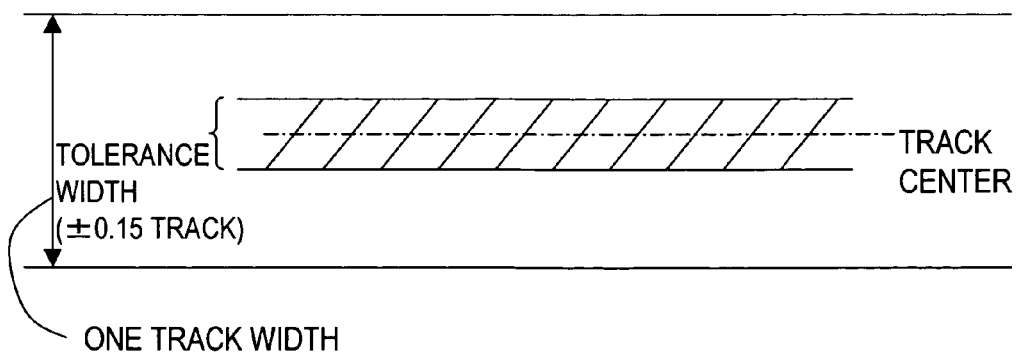
FIG. 12 is a diagram depicting the positioning accuracy for slice value computation based on FIG. 11.

FIG. 6 is a functional block diagram depicting the first embodiment of the settling judgment mechanism of the present invention, FIG. 7 is a flow chart depicting the measurement processing for evaluating the settling judgment formula of the present invention, FIG. 8 is a block diagram depicting the measurement processing in FIG. 7, FIG. 9 is a diagram depicting the measurement processing in FIG. 7 and FIG. 8, FIG. 10 shows a table of measurement processing results in FIG. 7 to FIG. 9, FIG. 11 is a characteristic diagram depicting the frequency vs. maximum value ratio in each judgment formula based on the measurement in FIG. 7, and FIG. 12 is a diagram depicting the tolerance of settling judgment.

As FIG. 6 shows, the settling judgment block 24 is comprised of 2 judgment formula (judgment value computation) blocks 50 and 58, delay blocks 52-1 to 52-$m$, and 60-1 to 60-$m$ for a number of the judgment samples, settling judgment blocks 54-1 and 54-2 and AND circuit 56.

First the position error 'e' is input to the first judgment formula block 50, and the judgment value is computed using the first settling judgment formula (y[n]=e) in the first judgment formula block 50. The judgment value is sequentially delayed by the delay blocks 52-1, . . . , 52-$m$. The outputs of the judgment formula block 50 and each delay block 52-1, ..., 52-*m* are input to the first settling judgment block 54-1.

The position error 'e' is also input to the second judgment formula block 58, and the judgment value is computed using the second settling judgment formula (y[n]+y[n−1]+y[n−2]) in the second judgment formula block 58. The judgment value is sequentially delayed by the delay block 60-1, ..., 60-*m*. The outputs of the judgment formula block 58 and each delay block 60-1, ..., 60-*m* are input to the second settling judgment block 54-2.

The first settling judgment block 54-1 judges whether each input of (m+1) samples of judgment value y[n], judgment value y[n−1], ..., judgment value y[n−m] is less than the first slice value, and settling is determined if inputs of all the samples are less than the first slice value.

The second settling judgment block 54-2 judges whether each input of (m+1) samples of the judgment value (y[n]+y[n−1]+y[n−2]), judgment value (y[n−1]+y[n−2]+y[n−3]), ..., judgment value (y[n−m]+y[n−m−1]+y[n−m−2]) is less than the second slice value, and settling is determined if inputs of all the samples are less than the second slice value.

AND of the settling judgment results of the first and second settling judgment blocks 54-1 and 54-2 is determined by the AND circuit 56, and the settling judgment result is output.

In other words, in the present invention, the position y[n] itself and the average value of the positions of 3 samples (y[n]+y[n−1]+y[n−2]) are used as the settling judgment formulas.

The reason why using the average value of the positions of the plurality of samples together with y[n] will be described. In the present invention, the maximum amplitude of the position error after settling judgment is measured for each frequency of the position error. First an overview of the measurement processing will be described with reference to FIG. 8 and FIG. 9.

Since the object (head 3 in FIG. 1) forms a vibrating locus with respect to the target position, and converges to the target position, when positioning, so the sine wave is regarded as the position error for measurement process. And it is determined how many ratios that the maximum amplitude of the next sample or the maximum amplitude between the current sample and the next sample after settling judgment is completed, compared with the value of the settling judgment formula, and the maximum value of the magnification ratio is determined. Since the frequency of the position error changes depending on the seek distance and external vibration, the maximum value of the magnification ratio is determined using various frequencies.

This will be described with specifics. As FIG. 8 shows, the frequency F and the phase Phase are specified to the sine wave generation block 30, and the sine wave generation block 30 generates the sine wave Y having the specified frequency F and phase Phase. This sine wave Y is input to the judgment formula block 32, which computes the judgment value using judgment formulas at a predetermined sample period. Here the judgment formulas are the value of each sample Y[n], the estimated position of one sample ahead (2·Y[n]−Y[n−1]) which uses the value of the current sample Y[n] and the value of the previous sample Y[n−1], and the added value of three samples (Y[n]+Y[n−1]+Y[n−2]).

The value of the judgment formula is sequentially delayed by the delay blocks 34-1 to 34-*m*, and the input and output of the delay blocks are input to the maximum value judgment block 36, and the maximum value Max1 thereof is acquired. In the case of FIG. 9, one sample of a sample point period is set after 5 samples of the judgment period.

The number of the delay blocks 34-1 to 34-*m*, which are set for 5 samples, is 4, and if the judgment formula is the position itself Y[n], the 5 samples of judgment values, that is Y[n−4]−Y[n], are input to the maximum value judgment block 36, and the maximum value Max1 thereof is acquired in the maximum value judgment block 36.

The sine wave Y of the sine wave generation block 30, on the other hand, is input to the analog waveform maximum value acquisition block 40. The analog waveform maximum value acquisition block 40 acquires the maximum value Max2 of the sine wave Y in the sample period after the judgment period in FIG. 9.

The maximum value Max1 is determined at one sample before the maximum value Max2, and is delayed by the delay block 38, and is input to the division block 42. The division block 42 determines the maximum value ratio Rate (=Max2/Max1) from the absolute value of the maximum value Max1 and the absolute value of the maximum value Max2.

As FIG. 9 shows, sine waves F1 (P1)-F1 (Pn) having the phases P1-Pn respectively are generated for one frequency F1, the maximum value ratio Rate of each phase of the frequency F1 is computed, and the maximum value acquisition block 44 acquires the maximum value Rate Max of the maximum value ratio Rate of each phase.

This means that it is measured what degree the maximum value of the judgment result, after judging a position error using a judgment formula in a predetermined judgment period (5 samples in FIG. 12), appears in the position errors (amplitude values) in the subsequent sample point period. In other words, the maximum value Max1 of the judgment values in the judgment period of a certain frequency and the maximum value Max2 in the sample period after the judgment period are measured, and the judgment formula is evaluated based on the maximum value ratio.

The maximum value Rate (Max) of the maximum value ratio in this frequency is measured while changing the sine wave (that is, position error), as shown in FIG. 9. For example, as Fn in FIG. 9 shows, the maximum value Rate (Max) of the maximum value ratio in the above mentioned specific frequency is measured while changing the frequency.

The amplitude maximum ratio (maximum value of the maximum value ratio) of each frequency acquired like this is stored in a table for each measurement frequency, as shown in FIG. 10. In other words, a table storing maximum ratio Rate (Max) in each frequency F (=f1, f2, ..., fn) is acquired.

This measurement can be implemented by execution of a program, which will be described according to the flow in FIG. 7.

(S10) The setting frequency F is initialized to dF.

(S12) The setting phase Phase is initialized to "0", and the maximum ratio Rate (Max) is initialized to "0".

(S14) Sine wave Y=sin (2πF+Phase) is generated.

(S16) The generated sine wave Y is computed for the number of samples in the judgment period (5 samples in FIG. 9) using the above mentioned judgment formula, and the maximum value Max1 thereof is determined.

(S18) In the same way, the maximum value Max2 in the sample point period (see FIG. 9) from the judgment period of the generated sine wave Y to the next sample point is determined.

(S20) The ratio Rate (Phase) of the maximum values Max2 and Max1 with the phase Phase is computed using Rate (Phase)=abs (Max2/Max1).

(S22) It is judged whether the computed ratio Rate (Phase) is greater than the maximum ratio RateMax (F) thus far with this frequency. If Rate (Phase) is greater than the maximum ratio RateMax (F), the maximum ratio RateMax (F) is updated to the computed Rate (Phase).

(S24) Then the setting phase Phase is updated to (Phase+ dPhase) so as to change the phase.

(S26) It is judged whether the update setting phase Phase is $2\pi$ or more. If the setting phase is $2\pi$ or more, processing returns to step S14.

(S28) If the updated setting phase Phase is $2\pi$ or more, the computation of the maximum ratio of the setting frequency F completes. Therefore the setting frequency F is updated to (F+dF) so as to move to the processing of the next frequency. And it is judged whether the updated setting frequency F is Fs (sampling frequency)/2 or more. If the updated setting frequency F is Fs (sampling frequency)/2 or more, the setting frequency F has reached the Nyquist frequency, so processing ends since control is impossible. If the updated setting frequency F is not Fs (sampling frequency)/2 or more, processing returns to step S12, and the maximum ratio of the next frequency is computed.

The computed result is stored in the table, as shown in FIG. 10. The judgment formula is evaluated by the maximum amplification ratio of each frequency in the judgment sample count of the judgment formula. In other words, in the measurement in FIG. 8 and FIG. 9, the maximum value of the position deviation amount at the next sample is measured for a judgment value with the judgment formula when a position error (sine wave) with same amplitude is applied during the judgment period. By this, characteristics for each frequency of the judgment formula can be evaluated.

FIG. 11 is a relational diagram of frequency vs. maximum amplification ratio MaxRate when the judgment sample count is "5". Here the relationship when the judgment formula is y[n], (2*y[n]−y[n−1]), and (y[n]+y[n−1]+y[n−2] are shown. In FIG. 11, the abscissa shows a frequency which is normalized with the sampling frequency Fs as "1", measured only at sampling points.

This relational diagram shows that when one judgment formula is used, the maximum amplitude ratio differs depending on the frequency, and that if a judgment formula differs then the maximum amplitude also differs.

As FIG. 11 shows, in the case when the judgment formula is y[n] and when the judgment sample count is 5 samples, the maximum of the maximum amplitude ratio is "1.5" in all frequency areas except for the area near the Nyquist frequency. This means that if the judgment value of this judgment formula is "1", the head position deviates a maximum of 1.5 times at the next sample.

In the same way, in the case when the judgment formula is (2*y[n]−y[n−1]) and when the judgment sample count is 5 samples, in the low frequency area, the maximum of the maximum amplitude ratio is "1". Also in the case when the judgment formula is (y[n]+y[n−1]+y[n−2] and when the judgment sample count is 5 samples, in the low frequency area, the maximum of the maximum amplitude ratio is "0.65". This means that the position deviation amount at the next sample, due to the judgment value, is less in the low frequency area if the average value (added value) of positions based on the judgment formula (y[n]+y[n−1]+y[n−2]) is used than if the estimated position of one sample ahead based on the judgment formula (2*y[n]−y[n−1]) is used.

For example, in the case of a magnetic disk, tolerance (positioning accuracy) with respect to the track center to be provided is ±0.15 of one track width, as shown in FIG. 12. In this case, the maximum position deviation amount of each judgment formula is different depending on the frequency, so if the estimated position of one sample ahead based on the judgment formula (2*y[n]−y[n−1]) and the average value of positions based on the judgment formula (y[n]+y[n−1]+y[n−2]) are compared, the maximum position deviation amount is smaller when the judgment formula (y[n]+y[n−1]+y[n−2]) is used in the low frequency area, if a same position error vibration is applied.

This means that if the maximum position deviation is the same when the judgment formula (2*y[n]−y[n−1]) is used and when the judgment formula (y[n]+y[n−1]+y[n−2]) is used, the greater maximum position error to be input is allowed for the judgment formula (y[n]+y[n−1]+y[n−2]). Therefore in the low frequency area, larger vibration is allowed if the judgment formula (y[n]+y[n−1]+y[n−2]) is used. Therefore a large judgment margin can be taken in the low frequency area.

In the high frequency area, on the other hand, the maximum position deviation amount is smaller when the judgment formula (2·y[n]−y[n−1]) is used if the same position error vibration is applied.

This means that if the maximum position deviation is the same when the judgment formula (2*y[n]−y[n−1]) is used and when the judgment formula (y[n]+y[n−1]+y[n−2]) is used, the greater maximum position error to be input is allowed for the judgment formula (2·y[n]−y[n−1]). Therefore in the high frequency area, larger vibration is allowed if the judgment formula (2·y[n]−y[n−1]) is used. Therefore a larger judgment margin can be taken in the high frequency area.

In other words, in the case when the judgment formula is (y[n]+y[n−1]+y[n−2]), judging as a deviation from the settling judgment conditions by mistake can be decreased, even if vibration exists in the low frequency area, and operations (e.g. read/write operation) can be continued.

In this way, the sine wave is provided as the position error, the maximum value of the position error between the specified sample and the next sample is determined, and the ratio of the maximum value of the position error between these samples and the ratio of the maximum values of the settling judgment formula in the judgment period is determined. For the value of this ratio, the maximum value of the ratio is determined for each frequency while changing the phase of the sine wave. And the frequency characteristics of the settling judgment formula are evaluated based on the maximum value of the maximum value ratio of each frequency.

Therefore the combination of the settling judgment formulas having a wide settling judgment margin can be determined in a wide frequency range.

Second Embodiment of Settling Judgment Mechanism

Figure 13:
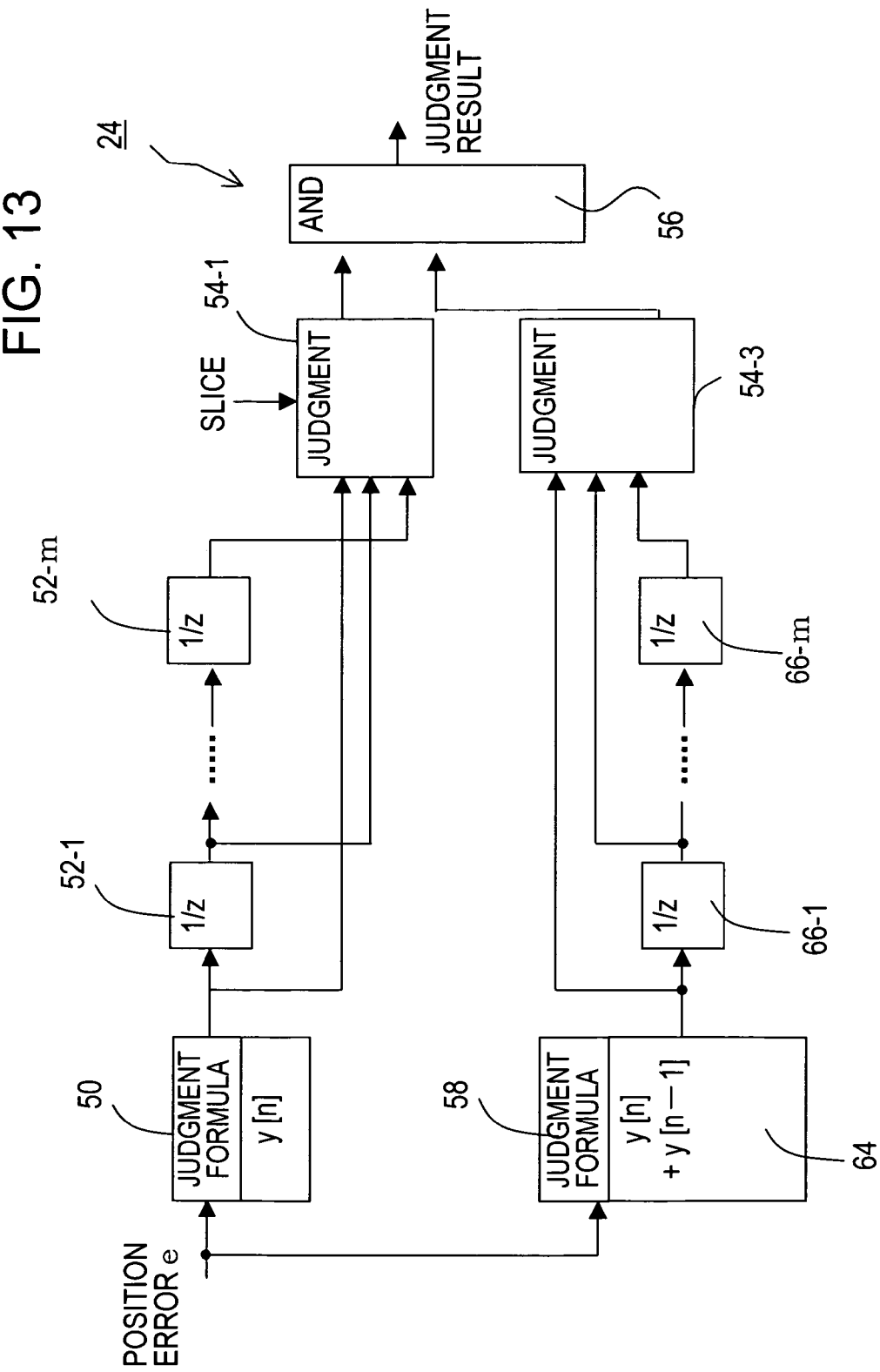
FIG. 13 is a block diagram depicting the settling judgment block according to the second embodiment of the present invention.

FIG. 13 is a block diagram depicting the second embodiment of the settling judgment mechanism of the present invention, and composing elements the same as those shown in FIG. 6 are denoted with the same reference numbers. As FIG. 13 shows, the settling judgment block 24 is comprised of 2 judgment formula (judgment value computation) blocks 50 and 64, delay blocks 52-1 to 52-m and 66-1 to 66-m for a number of judgment samples, settling judgment blocks 54-1 and 54-3 and AND circuit 56.

First the position error 'e' is input to the first judgment formula block 50, and the judgment value is computed using the first settling judgment formula (y[n]=e) in the first judgment formula block 50. The judgment value is sequentially delayed by the delay blocks 52-1, . . . , 52-m. The outputs of the judgment formula block 50 and each delay block 52-1, . . . , 52-m are input to the first settling judgment block 54-1.

The position error 'e' is also input to the third judgment formula block 64, and the judgment value is computed using the third settling judgment formula (y[n]+y[n−1]) in the third judgment formula block 64. The judgment value is sequentially delayed by the delay blocks 66-1, ..., 66-m. The outputs of the judgment formula block 64 and each delay block 66-1, ..., 66-m are input to the third settling judgment block 54-3.

The first settling judgment block 54-1 judges whether each input of (m+1) samples of the judgment value y[n], judgment value y[n−1], ... and judgment value y[n−m] is less than the first slice value, and settling is determined if the inputs of all the samples are less than the first slice value.

The third settling judgment block 54-3 judges whether each input of [m+1] samples of the judgment value (y[n]+y[n−1]), judgment value (y[n−1]+y[n−2]), ..., and judgment value (y[n−m]+y[n−m−1]) is less than the third slice value, and settling is determined if the inputs of all the samples are less than the third slice value.

AND of the settling judgment results of the first and third settling judgment blocks 54-1 and 54-3 is determined by the AND circuit 56, and the settling judgment result is output.

In other words, in the present embodiment, the position y[n] itself and the average value of the positions of 2 samples (y[n]+y[n−1]) are used as the settling judgment formulas.

Figure 14:
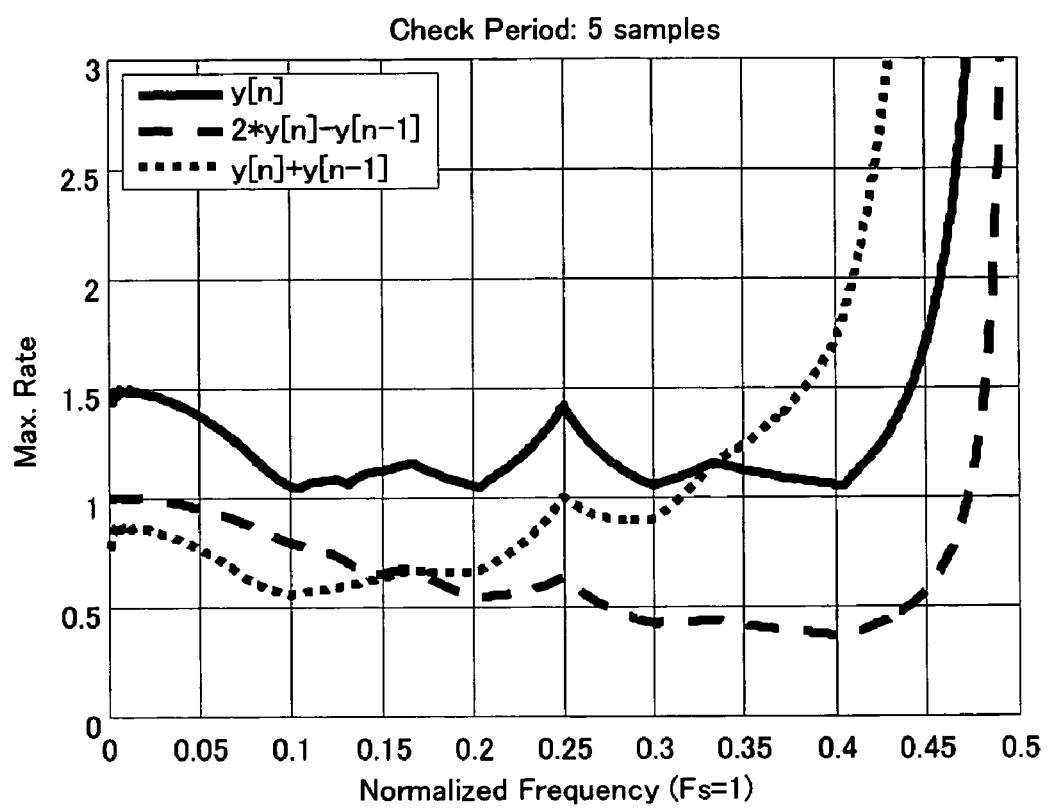
FIG. 14 is a relational diagram depicting the 5 sample judgment period acquired by the maximum value ratio computation for each frequency in FIG. 7 according to the second embodiment.

FIG. 14 is a relational diagram of frequency vs. maximum amplification ratio MaxRate when the judgment sample count is "5", measured by the measurement processing in FIG. 7 to FIG. 10. Here the relationships when the judgment formula is y[n], (2*y[n]−y[n−1]) and (y[n]+y[n−1]) are shown. In FIG. 14, the abscissa shows a frequency which is normalized with the sampling frequency Fs as "1", measured only at sampling points.

As FIG. 14 shows, in the case when the judgment formula is y[n] and when the judgment sample count is 5 samples, the maximum of the maximum amplitude ratio is "1.5" except for an area near the Nyquist frequency. This means that the judgment value of this judgment formula deviates 1.5 times at the maximum.

In the same way, in the case when the judgment formula is (2*y[n]−y[n−1]) and when the judgment sample count is 5 samples, the maximum of the maximum amplitude ratio is "1" except for an area near the Nyquist frequency. Also in the case when the judgment formula is (y[n]+y[n−1]) and when the judgment sample count is 5 samples, the maximum of the maximum amplitude ratio is "0.8" except for an area near the Nyquist frequency. This means that the maximum position deviation at the next sample in the low frequency area is less in the average value (added value) at the position based on the judgment formula (y[n]+y[n−1]) than in the estimated position of one sample ahead based on the judgment formula (2*y[n]−y[n−1]).

In other words, in the case when the judgment formula is (y[n]+y[n−1]), the settling judgment margin for vibration in the low frequency area increases. Therefore judging as a deviation from settling judgment conditions by mistake can be decreased even if vibration exists in the low frequency area, and operations (e.g. read/write operation) can be continued.

Third Embodiment of Settling Judgment Mechanism

Figure 15:
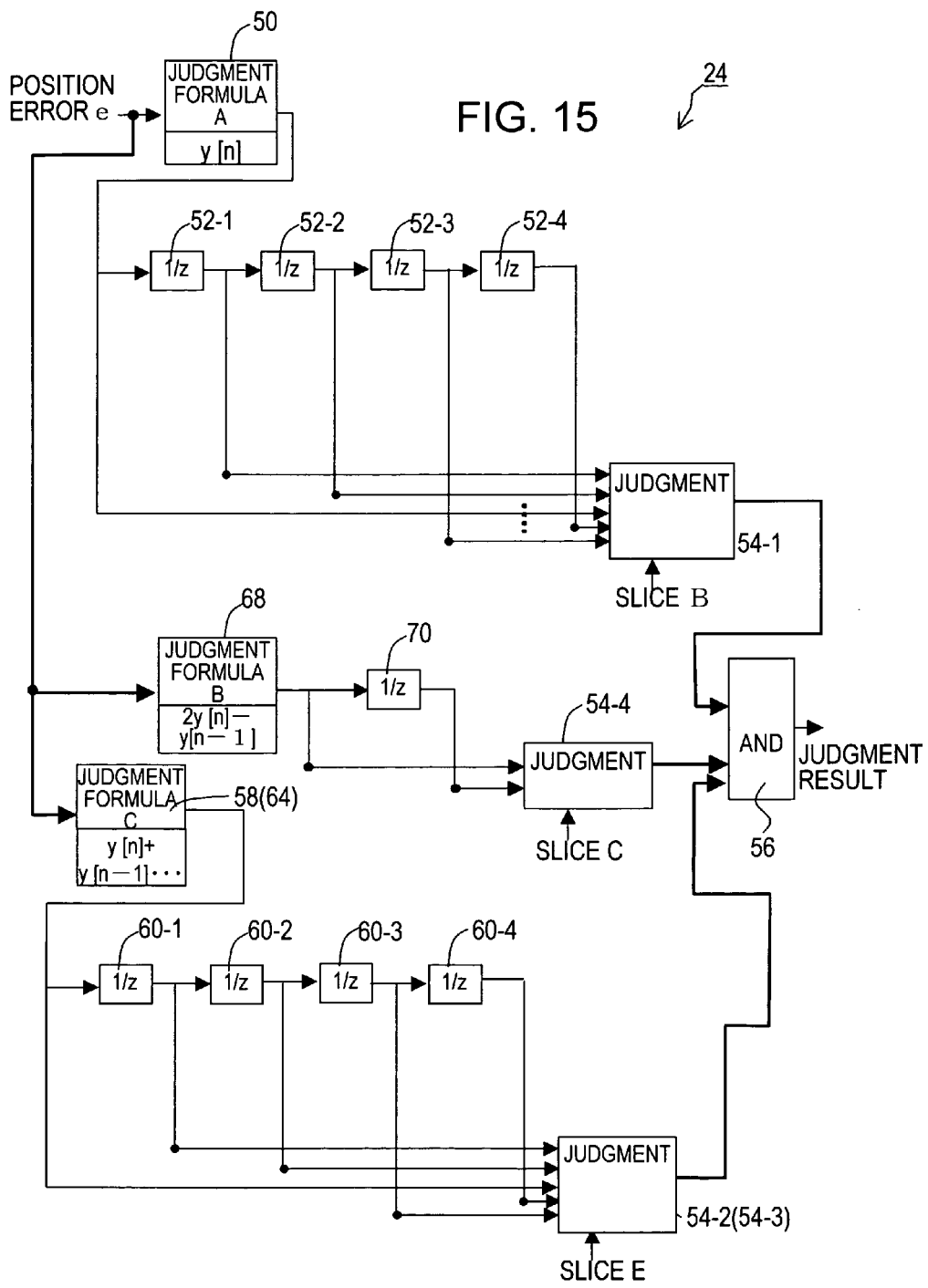
FIG. 15 is a diagram depicting the settling judgment mechanism according to the third embodiment of the present invention.

FIG. 15 is a block diagram depicting the third embodiment of the settling judgment mechanism of the present invention, and composing elements the same as those shown in FIG. 6 and FIG. 13 are denoted with the same reference numbers. As FIG. 15 shows, the settling judgment block 24 is comprised of 3 judgment formula (judgment value computation) blocks 50, 58 (64) and 68, delay blocks 52-1 to 52-4, 60-1 to 60-4 and 70 for a number of the judgment samples, settling judgment blocks 54-1, 54-2 (54-3) and 54-4 and AND circuit 56.

First the position error 'e' is input to the first judgment formula block 50, and the judgment value is computed using the first settling judgment formula (y[n]=e) in the first judgment formula block 50. The judgment value is sequentially delayed by the delay blocks 52-1, ..., 52-4. The outputs of the judgment formula block 50 and each delay block 52-1, ..., 52-4 are input to the first settling judgment block 54-1.

The position error 'e' is also input to the second judgment formula block 58 (64), and the judgment value is computed using the second or third settling judgment formula (y[n]+y[n−1]+y[n−2] or y[n]+y[n−1]) in the second judgment formula block 58 (64). The judgment value is sequentially delayed by the delay blocks 60-1, ..., 60-4. The outputs of the judgment block 58 (64) and each delay block 60-1, ..., 60-4 are input to the second or third settling judgment block 54-2 (54-3).

Also the position error 'e' is input to the fourth judgment formula block 68, and the judgment value is computed in the fourth judgment block 68 using the fourth settling judgment formula (2*y[n]−y[n−1]). The judgment value is delayed by the delay block 70. The outputs of the judgment formula block 68 and the delay block 70 are input to the fourth settling judgment block 54-4.

The first settling judgment block 54-1 judges whether each input of the 5 samples of judgment value y[n], judgment value y[n−1], ... and judgment value y[n−4] is less than the first slice value, and settling is determined if inputs of all the samples are less than the first slice value.

The second (or third) settling judgment block 54-2 (54-3) judges whether each input of 5 samples of judgment value (y[n]+y[n−1]+y[n−2] or y[n]+y[n−1]), judgment value (y[n−1]+y[n−2]+y[n−3] or y[n−1]+y[n−2]), ..., and judgment value (y[n−4]+y[n−5]+y[n−6] or y[n−4]+y[n−5]) is less than the third slice value, and settling is determined if inputs of all samples are less than the third slice value.

Also the fourth settling judgment block 54-4 judges whether each input of the 2 samples of judgment value (2*y[n]−y[n−1]) and judgment value (2*y[n−1]−y[n−2]) is less than the fourth slice value, and settling is determined if inputs of all the samples are less than the fourth slice value.

AND of the settling judgment results of the first, second (or third) and fourth settling judgment blocks 54-1, 54-2 (54-3) and 54-4 is determined by the AND circuit 56, and the settling judgment result is output.

In other words, in the present embodiment, the position y[n] itself, the average value of the positions of the 2 or 3 samples (judgment value y[n]+judgment value y[n−1]+judgment value y[n−2] or y[n]+y[n−1]) and the estimated position of one sample ahead (2*y[n]−y[n−1]) are used as the settling judgment formulas.

This means that the settling judgment configuration of the estimated position of one sample ahead (2*y[n]−y[n−1]) is added to the settling judgment configuration of the first and second embodiments. As FIG. 11 and FIG. 14 show, the margin is small in relatively high frequency components in the case of settling judgment based on the added value (average value). In the case of settling judgment based on the estimated position of one sample ahead, the margin is small in a low frequency area, but the margin is large in a high frequency area.

In this example, setting judgment with a large margin is implemented for all the frequencies by adding settling judgment based on the estimated position of one sample ahead.

Other Embodiments of Settling Judgment

Figure 16:
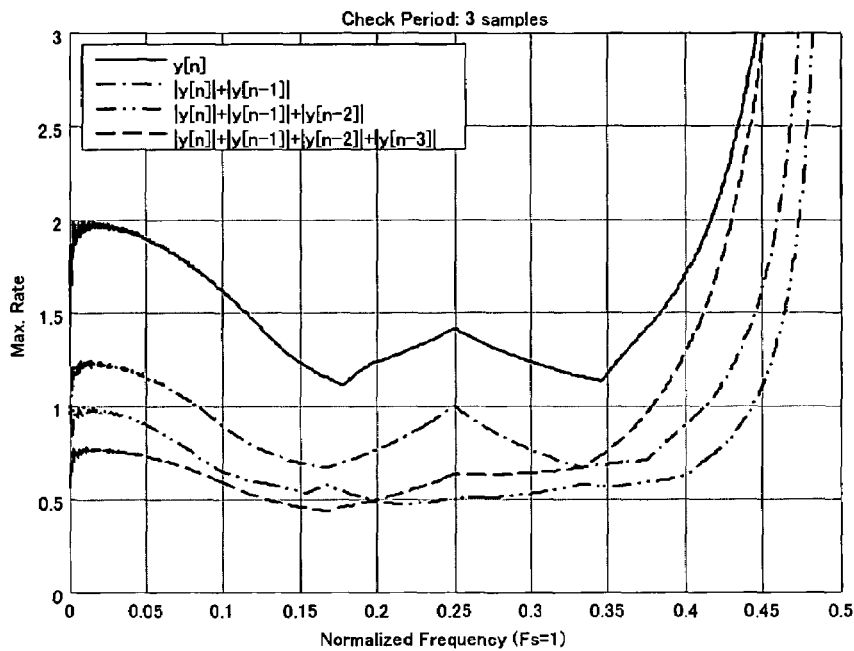
FIG. 16 is a frequency characteristic diagram depicting the case when the judgment sample count is 5 based on another settling judgment formula of the present invention.
Figure 17:
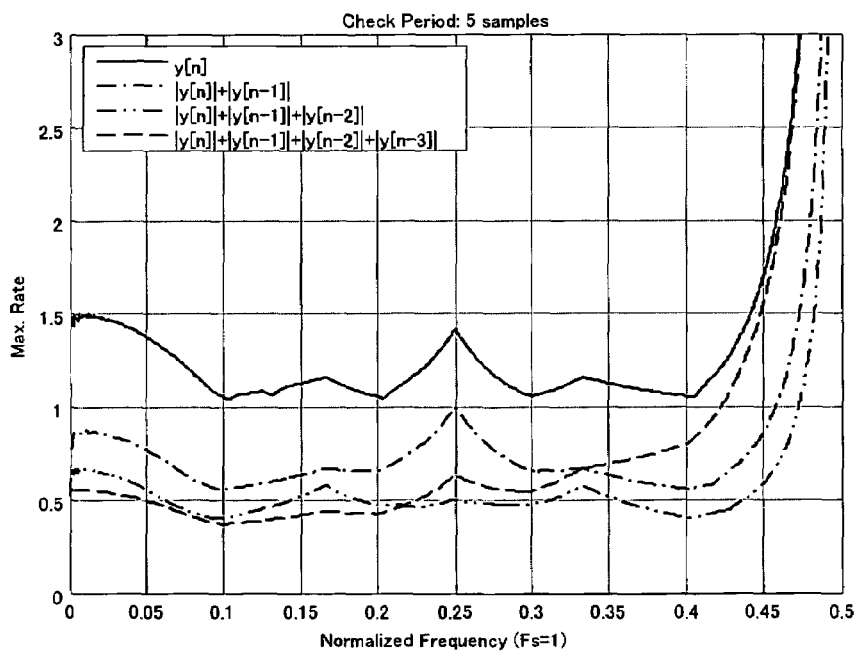
FIG. 17 is a frequency characteristic diagram depicting the case when the judgment sample count is 3 based on another settling judgment formula of the present invention.

FIG. 16 and FIG. 17 are diagrams depicting other settling judgment conditions of the present invention, where FIG. 16 is a relational diagram of frequency vs. maximum value ratio when 3 samples are used, and FIG. 17 is a relational diagram of frequency vs. maximum value ratio when 5 samples are used.

As FIG. 16 and FIG. 17 show, settling judgment formulas adding the absolute values of judgment values in 2, 3 and 4 samples are used as the above mentioned addition values. In other words, (|y[n]|+|y[n−1]|) in the case of 2 samples, (|y[n]|+|y[n−1]|+|y[n−2]|) in the case of 3 samples, and (|y[n]|+|y[n−1]|+|y[n−2]|+|y[n−3]|) in the case of 4 samples are used.

Just like FIG. 11 and FIG. 14, frequency vs. maximum value ratio is measured using 3 samples and 5 samples. FIG. 16 shows the frequency vs. maximum value ratio of position y[n] in the case of 3 samples, and frequency vs. maximum value ratio in the case of the addition of absolute values of 2, 3 and 4 samples. FIG. 17 shows the frequency vs. maximum value ratio of position y[n] in the case of 5 samples, and frequency vs. maximum value ratio in the case of the addition of absolute values of 2, 3 and 4 samples.

Comparing FIG. 11 and FIG. 14, the maximum value ratio is small even in the high frequency area in the case of the absolute value addition format, and therefore the settling judgment margin can be increased not only for a low frequency area but also for a high frequency area.

Other Embodiments

In the above embodiments, the positioning control device was described using an example of a head positioning device of a magnetic disk device, but the present invention can also be applied to other disk devices, such as optical disk device, and can also be applied to a positioning control device for an object other than a disk device. For the tolerance (positioning accuracy), other values can be used, and for the judgment sample count as well, other values can be used. It is preferable that the judgment sample count is 5 samples or less, and the number of samples to be added is 4 or less, considering the judgment speed.

The present invention was described using embodiments, but the present invention can be modified in various ways within the scope of the essential character thereof, and these variant forms shall not be excluded from the scope of the present invention.

Since both the position error and the added value of a plurality of samples of the position error are used as the settling judgment formulas, the margin of the settling judgment, particularly for vibration in the low frequency area, increases. Therefore even if vibration exists in the low frequency area, judging as a deviation from settling judgment conditions by mistake can be decreased, and operations (e.g. read/write operation) can be continued.

What is claimed is:

1. A settling judgment method of judging settling of an object to a target position of a positioning control device which performs position control according to a position error between the target position and a current position, comprising:

a step of computing the position error for each sample;

a first computing step of computing a first judgment value from the position error for each of the samples;

a first judgment step of judging whether a sample count, in which the first judgment value becomes less than a first slice value continuously, has reached a first judgment sample count;

a second computing step of computing a second judgment value from added position errors of a plurality of samples for each of the samples;

a second judgment step of judging whether a sample count, in which said second judgment value becomes less than a second slice value continuously, has reached a second judgment sample count; and a step of outputting AND of the judgment results of the first judgment step and the second judgment step as a settling judgment result, wherein the second computing step comprises a step of computing the second judgment value by adding the absolute values of the position errors of the plurality of samples.

2. The settling judgment method for a positioning control device according to claim 1, wherein the second judgment step comprises a step of judging whether the sample count has reached the second judgment sample count which is equal to or less than 5.

3. The settling judgment method for a positioning control device according to claim 2, wherein the second computing step comprises a step of computing the second judgment value by the addition of the position errors of equal to or less than 4 samples.

4. The settling judgment method for a positioning control device according to claim 1, wherein the first judgment step comprises a step of judging whether the sample count has reached the first judgment sample count which is equal to or less than 5.

5. The settling judgment method for a positioning control device according to claim 1, further comprising:

a third computing step of computing a third judgment value from a difference between said position error of the current sample and the position error of the previous sample for each of the samples; and a third judgment step of judging whether the sample count, in which the third judgment value becomes less than a third slice value continuously, has reached a third judgment sample count, wherein the output step comprises a step of outputting AND of the judgment results of the first judgment step, the second judgment step and the third judgment step as a settling judgment result.

6. The settling judgment method for a positioning control device according to claim 1, wherein the output step comprises a step of outputting the judgment result on whether the position of a head is settled at the target position on a disk.

7. A position control device, comprising:

a position control block for performing position control for an object according to a position error between a target position and a current position; and a settling judgment block for computing a first judgment value from the position error for each sample, and judging whether a sample count, in which the first judgment value becomes less than a first slice value continuously, has reached a first judgment sample count, wherein the settling judgment block computes a second judgment value from added position errors of a plurality of samples for each of the samples, judges whether a sample count, in which the second judgment value becomes less than a second slice value continuously, has reached a second judgment sample count, and outputs AND of the two judgment results as a settling judgment result, wherein the settling judgment block computes the second judgment value by adding the absolute values of the position errors of the plurality of samples.

8. The position control device according to claim 7, wherein the settling judgment block judges whether the sample count has reached the second judgment sample count which is equal to or less than 5.

9. The position control device according to claim 8, wherein the settling judgment block computes the second judgment value by the addition of the position errors of equal to or less than 4 samples.

10. The position control device according to claim 7, wherein the settling judgment block judges whether the sample count has reached the first judgment sample count which is equal to or less than 5.

11. The position control device according to claim 7, wherein the settling judgment block computes a third judgment value from a difference between the position error of the current sample and the position error of the previous sample for each of the samples, judges whether the sample count, in which the third judgment value becomes less than a third slice value continuously, has reached a third judgment sample count, and outputs AND of the three judgment results as a settling judgment result.

12. The position control device according to claim 7, wherein the settling judgment block outputs the judgment result on whether the position of a head is settled at the target position on a disk.

13. The position control device according to claim 12, wherein the settling judgment block judges whether the head is settled in the position accuracy range of the target position.

14. The position control device according to claim 12, wherein the settling judgment block judges whether the head during seek control of the head is settled at the target position.

15. The position control device according to claim 12, wherein the settling judgment block judges whether the head is following up the target position.

* * * * *